US011520510B1

(12) United States Patent
Thangaraj et al.

(10) Patent No.: US 11,520,510 B1
(45) Date of Patent: Dec. 6, 2022

(54) EXTENDING THE LIFESPAN OF A FLASH-BASED STORAGE DEVICE

(71) Applicant: International Business Machines Corporation, Armonk, NY (US)

(72) Inventors: Krishna Thangaraj, Poughkeepsie, NY (US); Kenneth Galbraith, Binghamton, NY (US); James Edouard, Endicott, NY (US); Brittany Ross, Saugerties, NY (US); Hubertus Franke, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/381,832

(22) Filed: Jul. 21, 2021

(51) Int. Cl.
*G06F 12/00* (2006.01)
*G06F 3/06* (2006.01)

(52) U.S. Cl.
CPC ............ *G06F 3/064* (2013.01); *G06F 3/0619* (2013.01); *G06F 3/0631* (2013.01); *G06F 3/0659* (2013.01); *G06F 3/0679* (2013.01)

(58) Field of Classification Search
CPC ...... G06F 3/064; G06F 3/0619; G06F 3/0631; G06F 3/0659; G06F 3/0679
USPC .......................................................... 711/154
See application file for complete search history.

(56) References Cited

U.S. PATENT DOCUMENTS

| 8,078,794 | B2 | 12/2011 | Lee | |
|---|---|---|---|---|
| 8,918,583 | B2 | 12/2014 | Hoang | |
| 9,524,105 | B2 * | 12/2016 | Samuels | ............... G06F 3/0688 |
| 10,635,324 | B1 | 4/2020 | Klein | |
| 2011/0161784 | A1 * | 6/2011 | Selinger | ............... G06F 11/1016 714/E11.002 |
| 2013/0227246 | A1 * | 8/2013 | Hirao | ................... G06F 12/0246 711/206 |
| 2018/0285258 | A1 | 10/2018 | Muchherla | |

FOREIGN PATENT DOCUMENTS

CN         105683927 B       11/2018

OTHER PUBLICATIONS

"6.3. Resizing an Ext4 File System", Red Hat Customer Portal, Downloaded from the Internet on May 3, 2021, 2 pgs., Copyright © 2021 Red Hat, Inc., <https://access.redhat.com/documentation/en-us/red_hat_enterprise_linux/6/html/storage_administration_guide/ext4grow>.

Ganza, et al., "Visualizing the Behavior of an Elastic, Energy-Efficient Database Cluster", Databases and Information Systems Group, 2015, University of Kaiserslautern, Germany, 4 pgs.

(Continued)

*Primary Examiner* — Mardochee Chery
(74) *Attorney, Agent, or Firm* — Christopher M. Pignato

(57) ABSTRACT

In an approach to extending the lifespan of a flash-based storage device, responsive to receiving a signal from a storage device that the storage device is low on extra blocks, one or more free logical blocks that are no longer needed are released. The storage device is notified of the one or more free logical blocks that are no longer needed. Responsive to determining that the number of valid physical blocks is greater than the number of used logical blocks, the advertised capacity of the storage device is reduced.

20 Claims, 9 Drawing Sheets

(56) References Cited

OTHER PUBLICATIONS

King, "Resize Dynamic Disk to Extend or Shrink Dynamic Disk", EaseUS Partition Master, Downloaded from the Internet on May 3, 2021, 17 pgs., < https://www.easeus.com/partition-master/resize-dynamic-disk.html>.

Lu, et al., "Extending the Lifetime of Flash-based Storage through Reducing Write Amplification from File Systems", 11th {USENIX} Conference on File and Storage Technologies (FAST' 13), 2013, 14 pgs.

Schall, et al., "Dynamic Physiological Partitioning on a Shared-Nothing Database Cluster", 31st International Conference on Data Engineering, IEEE, © 2015 IEEE, 2015, 12 pgs.

Wang, et al., "Minimizing Write Amplification to Enhance Lifetime of Large-page Flash-Memory Storage Devices", 2018 55th ACM/ESDA/IEEE Design Automation Conference (DAC), © 2018 ACM, IEEE, DOI: 10.1145/3195970.3196076, 2018, 6 pgs.

\* cited by examiner

EXTENDING THE LIFESPAN OF A FLASH-BASED STORAGE DEVICE

BACKGROUND

The present invention relates generally to the field of computer storage, and more particularly to extending the lifespan of a flash-based storage device.

A Solid State Drive (SSD) is a type of mass storage device similar to a hard disk drive (HDD). An SSD supports reading and writing data using integrated circuit assemblies, typically flash memory devices, to store data persistently, and functioning as secondary storage in the hierarchy of computer storage. Unlike hard drives, SSDs do not have any moving parts (which is why they are called solid state drives). Since SSDs have no moving parts, they don't have to "spin up" while in a sleep state and they don't need to move a drive head to different parts of the drive to access data. Therefore, SSDs can access data faster than HDDs.

A limitation of an SSD is that flash memory has a finite number of program—erase cycles. Most commercially available flash products have a guaranteed cycle count before the wear begins to deteriorate the integrity of the storage. This effect is mitigated in some chip firmware or file system drivers by counting the writes and dynamically remapping blocks in order to spread write operations between sectors; this technique is called wear leveling. Another approach is to perform write verification and remapping to spare sectors in case of write failure, a technique called bad block management.

SUMMARY

Embodiments of the present invention include a computer-implemented method for extending the lifespan of a flash-based storage device. In an embodiment, responsive to receiving a signal from a storage device that the storage device is low on extra blocks, one or more free logical blocks that are no longer needed are released. The storage device is notified of the one or more free logical blocks that are no longer needed. Responsive to determining that the number of valid physical blocks is greater than the number of used logical blocks, the advertised capacity of the storage device is reduced.

DETAILED DESCRIPTION

Figure 1:
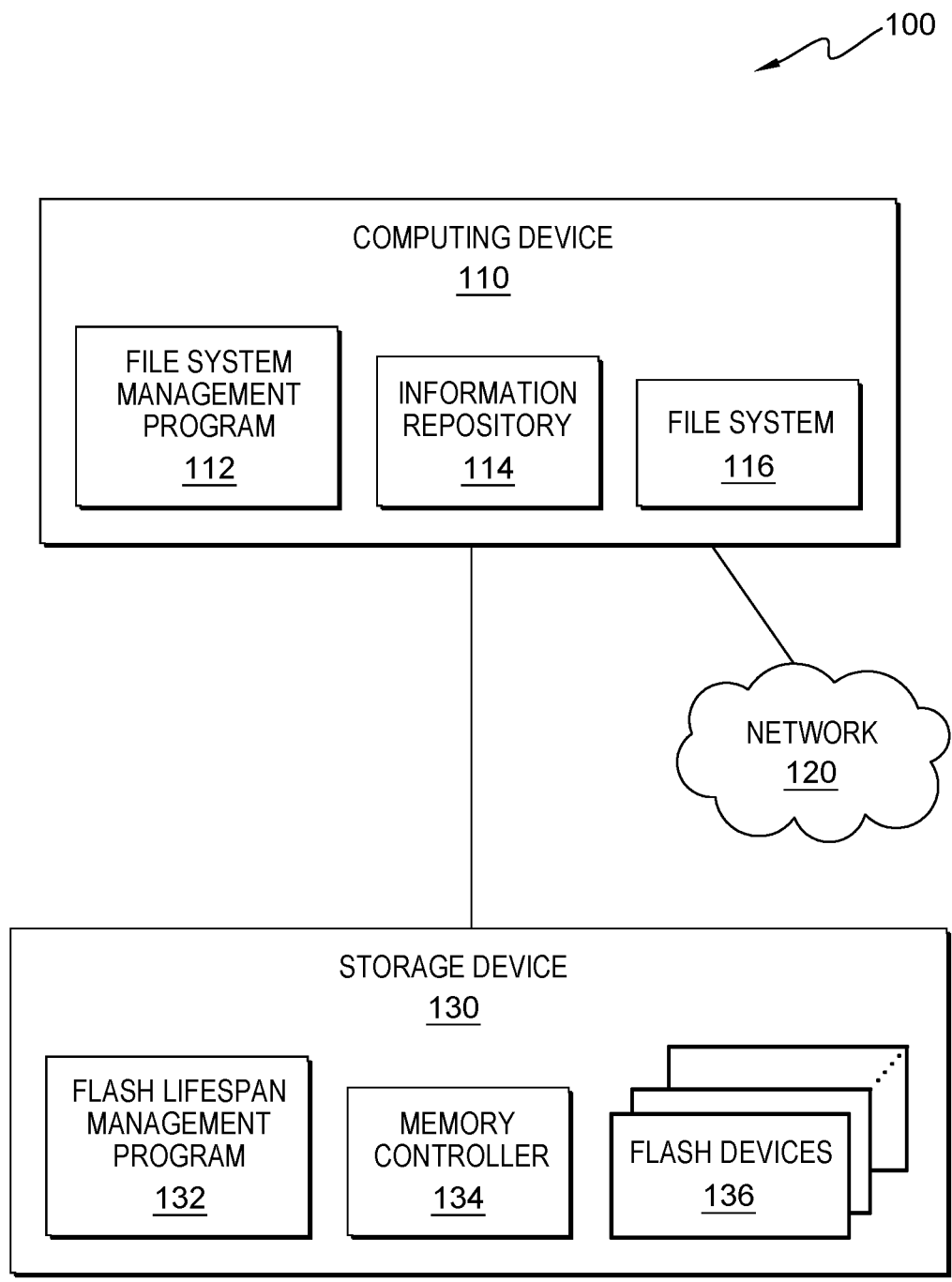
FIG. 1 is a functional block diagram illustrating a distributed data processing environment, in accordance with an embodiment of the present invention.

The present invention relates to the general area of storage and in particular to flash-based storage such as SSD but also including later versions such as Non-Volatile Memory Express (NVMe) and Storage Class Memory (SCM). A common problem that such devices exhibit is wear-out, where frequent writes to the same block location will render the block "expired" because it can no longer be charged to a level that can differentiate the values stored (0/1) from each block. To counter this phenomena, an SSD provides wear-leveling that relies on extra blocks in addition to the stated disk capacity and a Flash Translation Layer (FTL) that transparently maps logical blocks the file system sees at the host to physical blocks on the flash device. When a block reaches wear-out (typically identified when the data written to the block written is not the same as the data that is read back during verification) the SSD controller copies the content to a different free block, updates the FTL, and renders the worn-out block unreachable. Over time, it is to be expected that the device depletes all extra blocks and then becomes non-functional as no further worn-out blocks can be tolerated. The current practice relies on two techniques, or a combination of these two techniques, to delay wear-out of an SSD. In the first technique, the SSD provides means for wear-leveling. In the second technique, the operating system attempts to reduce writes.

SSDs engage in wear-leveling transparently to the user of the device. In particular, there are two forms of wear leveling. Dynamic wear leveling monitors high-use and low-use areas of flash memory. At a certain threshold, dynamic wear leveling will swap high-use blocks with low-use blocks. When performing this type of swapping, the controller needs to maintain a mapping of logical block addresses to actual flash memory block addresses, known as an FTL remapping. Whenever a block of data is written to flash memory, instead of overwriting the requested block (and wearing it out more), the data is written to a new block and the block map is updated. However, blocks that do not get modified will never get reused, and their content will remain as is. With static wear leveling, the same actions are performed but also periodically the static data (blocks that have not been modified) are moved to blocks that have been more heavily used to ensure that all blocks get a chance to be rewritten and therefore wear out evenly. In this way the SSD provides a means to effectively wear out all blocks at a more or less constant rate. At some point, however, blocks start to fail and need to be set aside and the device ultimately will fail when insufficient blocks are available to provide for the advertised capacity. SSDs further utilize write caches to potentially coalesce sequential writes into a larger block (e.g., flash blocks are 128 KB, while the operating system's view of a block is typically 512B-4 KB) thus resulting in fewer actual writes to flash.

Orthogonal to the SSD's wear leveling, the operating system/file system can reduce writes to disk as well by more aggressively caching and coalescing write blocks, thus alleviating the problems of too many writes of small logical blocks to larger SSD internal blocks.

In addition, the user can engage in assisting with reduced wear-out through various remedies that are advertised to delay the inevitable demise of an SSD due to wear leveling. Nevertheless, once the usable blocks on the SSD are down to the capacity that was advertised to the file system running on the host, the device will become non-functional. Note that such degradation is gradual, but once the required blocks as seen and expected by the file system can no longer be supplied by the SSD the device instantaneously becomes non-functional.

Therefore, it is desirable to dynamically shrink the file system without downtime as the available SSD capacity reaches or goes below the original advertised capacity to which the file system was formatted. Current file systems allows for dynamic resizing in the case of desired growth. Shrinking, however, as required by the problem space described above, can only be accomplished if the device is unmounted (i.e., device is not in use), which leads to system downtime and service interruption.

The present invention provides relief to the above constraints by interactions between the SSD status and the file system status to allow a more graceful degradation through dynamic file system resizing with zero down time.

The present invention relies on features that are not currently utilized. First, the SSD knows (although it hides) the number of additional blocks that are available on the device. Second, a file system maintains free logical blocks (although the free blocks might still contain old data or random data) which to the SSD is simply a used block. Third, file systems are rarely 100% utilized at the logical level.

In an embodiment of the present invention, the SSD communicates to the file system that it is running close to wear-out, i.e., it is low on capacity of extra blocks. The file system will release free logical blocks, notify the SSD that the freed blocks are no longer needed, and reduce the advertised capacity of the disk. As a result, there is a graceful degradation of the SSD capacity until the number of valid physical blocks reaches the number of used logical blocks.

In another embodiment, the writes to the device fail due to wear out (i.e., no extra working blocks remain), which in turn triggers the resizing operation indicated above.

When a system, e.g., distributed data processing environment 100 of FIG. 1, is initialized, the SSD initially advertises a specific size to the host system which can either partition the disk or leave the disk as a single partition. In general, partitions are fixed size contiguous sections of blocks, with each partition being identified by the starting block and the number of blocks. In the case of a single partition per disk in traditional hard drives, a disk block refers to a specific fixed location on the disk (cylinder:track: sector), but in an SSD it refers to a logical block (0 . . . n), whereas (n+1) is the size advertised by the SSD manufacturer. As discussed above, these logical blocks are actually dynamically mapped to physical blocks on the SSD and wear-leveling of an individual physical block means the logical block mapped to it will be remapped to a different physical block transparently to the operating system and the file system.

In the present invention, when the lower threshold of available physical blocks is reached the SSD controller will notify the operating system via a standard mechanism, e.g., an interrupt. The operating system device driver handling the interrupt will obtain the status from the SSD. The present invention calls this status a "low free blocks reached" (LFBR) event. Upon reception of the LFBR event, the device driver will signal the file system currently mapped on the partition that the LFBR event has occurred. Operation of the present invention on two common file systems currently in use are explained below.

Figure 4A:
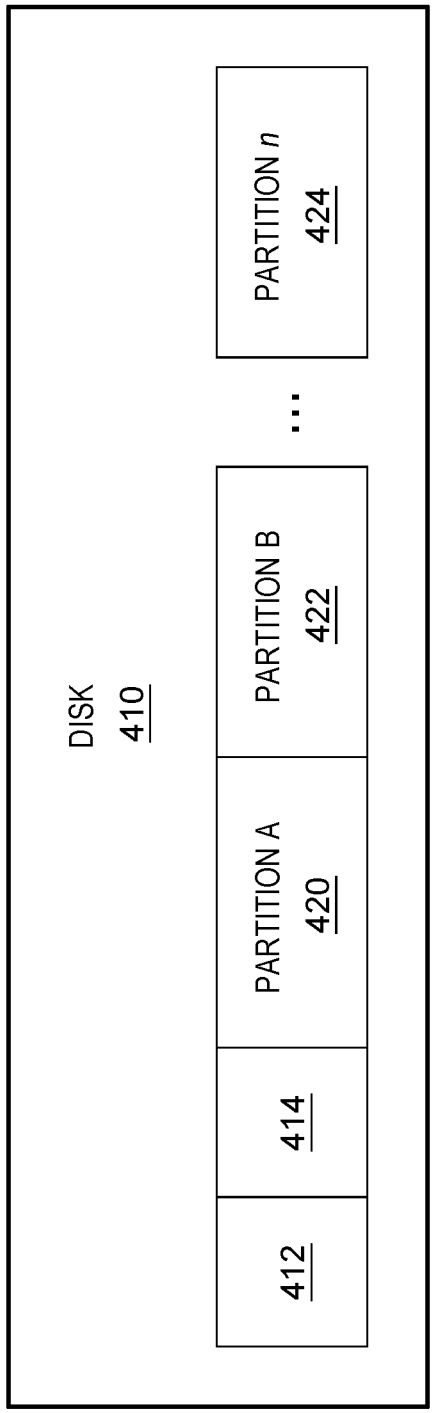
FIG. 4a is an example of a typical layout of a non-log-structured file system, on a storage device within the distributed data processing environment of FIG. 1, in accordance with an embodiment of the present invention.
Figure 4B:
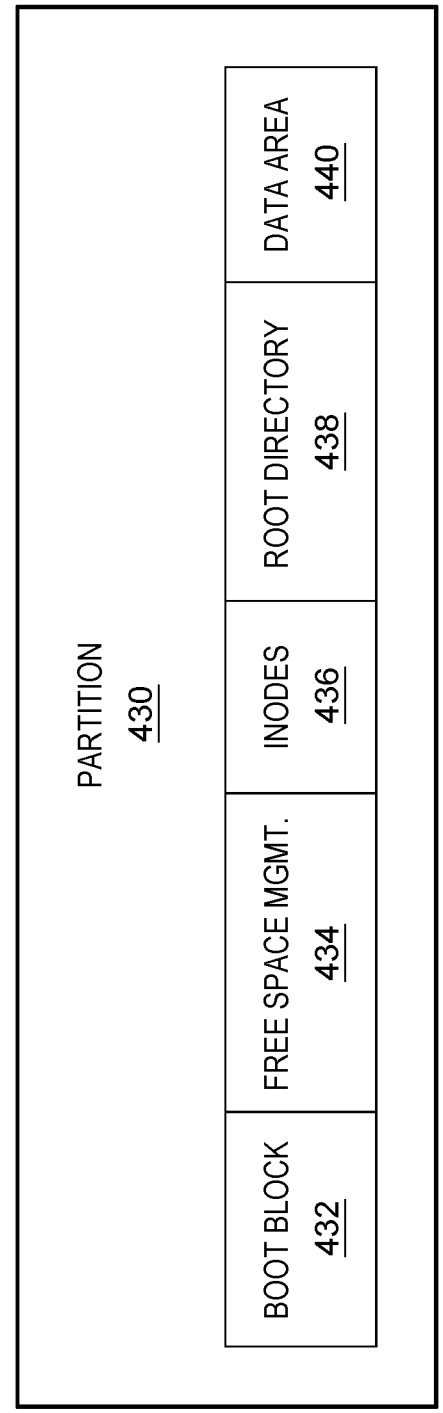
FIG. 4b is an example of a typical partition of the non-log-structured file system illustrated in FIG. 4a, on a storage device within the distributed data processing environment of FIG. 1, in accordance with an embodiment of the present invention.

In an embodiment, the classical ext2/3/4 file systems is in use. An example of this type of file system is shown in FIGS. 4a and 4b below. In this embodiment, the present invention will extend the various sections of the partition with either a limit or with a marker that a certain block is not to be used anymore. Boot/Super/Root sections (which are all small) cannot be so marked due to the critical functions of these sections. Files and directories cannot be touched either as they are data in use.

In this embodiment, the file system maintains via a bitmap an indication whether each logical block can be used. When an LFBR event is received, the file system examines the bitmap to determine how many blocks it can release, and then computes how many blocks it is willing to release to avoid the imminent wear-leveling exhaustion based on the number of blocks it can release. The present invention marks sufficient free blocks as unavailable, notifies via the device driver what logical blocks are voluntarily been given up by the file system, and the SSD releases the translation of the underlying physical block, thus returning blocks to the free pool. Over time the capacity of the SSD will gradually be reduced, but the present invention avoids early non-functionality of the device as with current technology, where the device fails as soon as the LFBR event occurs. Similarly, as file system today are sizing each partition's section based on some parameters (e.g., number of inodes vs. number of data blocks), logical blocks can be resized equally among the sections.

Figure 5A:
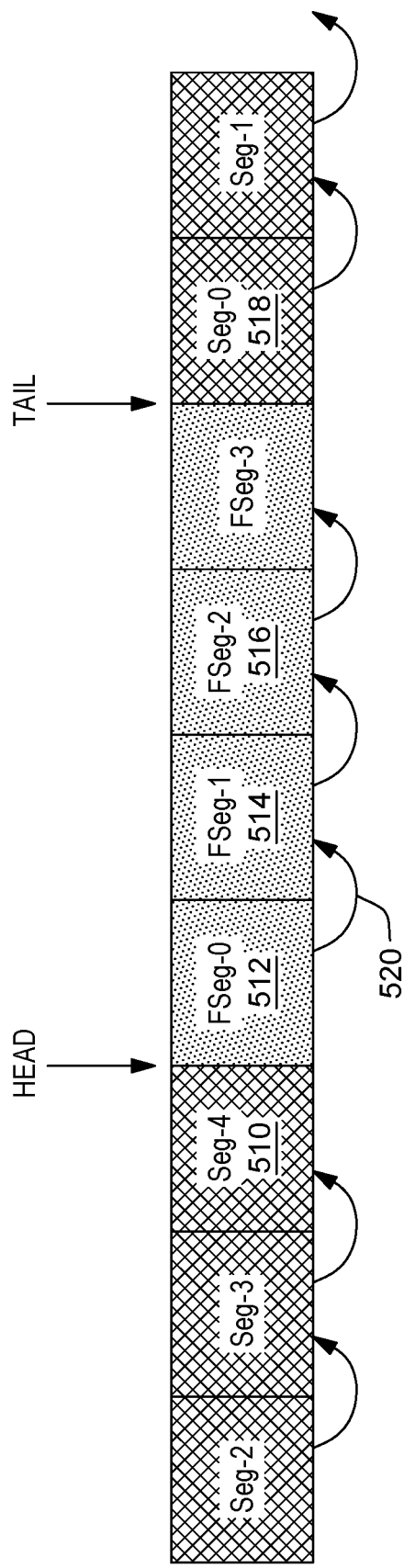
FIG. 5a is an example of a typical layout of an LFS file system, on a computing device within the distributed data processing environment of FIG. 1, in accordance with an embodiment of the present invention.
Figure 5B:
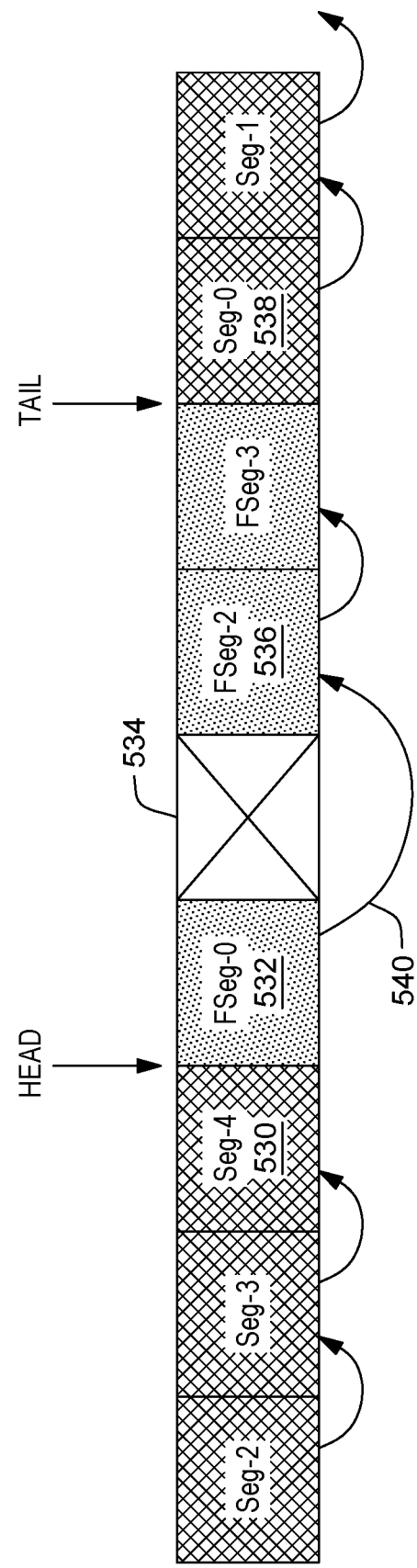
FIG. 5b is an example of a typical layout of file system in a log-structured file system from FIG. 5a, but with the present invention incorporated, on a computing device within the distributed data processing environment of FIG. 1, in accordance with an embodiment of the present invention.

In another embodiment, a log structured file system (LFS) is in use. An LFS is optimized for write performance and is well suited (if not better suited than the classical ext2/3/4 file systems) for SSDs. In an LFS, the disk is organized as a circular buffer. Any new writes (data as well as metadata, e.g., inodes) will be written to an in-memory segment (typically 1-4 MB versus the typical block size of 512B-4 KB). When the segment is filled, the entire segment is written as a whole to the disk at the front of the circular buffer, thus the reference as a log. The circular buffer will fill up eventually, but since there are no in-place overwrites, just additions to the log, there are orphaned segments (i.e., overwritten data and metadata blocks). In this embodiment, a cleaner thread goes through the tail of the log and analyzes each segment, identifying stale blocks and inodes. Anything not stale is written back to the front of the log, while the rest is discarded. Hence there should always be a section between the tail and the head that defines unused blocks of the file system, although they may have stale content and are still considered used blocks from the point of view of the device. When an LFBR event is reached, the file system will first run through the free section (i.e., from the tail to the head of the circular buffer), mark one or more segments as unused, and communicate that fact to the device which in return releases the physical blocks associated with the segment and marks the FTL entries for those logical blocks as not present. In addition, the segment (at the end a range of logical blocks) is set aside and removed from the circular log. Hence the log is organized as a logical circular buffer strung together with a sequence of segments easily chained together through a list. Removing a segment from the log implies that the pointer is skipped over when the head is moved. The organization of a current LFS is illustrated in FIG. 5a below, and an LFS utilizing the present invention is illustrated in FIG. 5b below.

Note that an LFBR event is either proactively pushed by the device to the host driver or passively achieved by a failing I/O write operation with a proper error condition.

FIG. 1 is a functional block diagram illustrating a distributed data processing environment, generally designated 100, suitable for operation of file system management program 112 and flash lifespan management program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes file system management program 112. In an embodiment, file system management program 112 is a program, application, or subprogram of a larger program for extending the lifespan of a flash-based storage device. In an alternative embodiment, file system management program may be located on any other device accessible by computing device 110 via network 120.

In an embodiment, computing device 110 includes information repository 114. In an embodiment, information repository 114 may be managed by file system management program 112. In an alternate embodiment, information repository 114 may be managed by the operating system of the device, alone, or together with, file system management program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, disk configuration data, file system data, flash device data, flash configuration data, operating system data, configuration data, and other data that is received by file system management program 112 from one or more sources, and data that is created by file system management program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

In an embodiment, computing device 110 includes file system 116, which is the file system in use by computing device 110 on storage device 130. In an embodiment, file system 116 may be a Log-Structured File system (LFS). In another embodiment, file system 116 may be a non-LFS file system. In yet another embodiment, file system 116 may be any type of file system that is appropriate for storage device 130 as would be known to one skilled in the art.

Distributed data processing environment 100 includes storage device 130. In an embodiment, storage device 130 is the storage device for computing device 110. In an embodiment, storage device 130 may be an SSD. In another embodiment, storage device 130 may be an NVM Express (NVMe) or Storage Class Memory (SCM) device. In yet another embodiment, storage device 130 may be any other flash storage device as would be known to one skilled in the art. In an embodiment, storage device 130 is a single device, e.g., a single SSD. In another embodiment, distributed data processing environment 100 may contain any number of storage devices.

In an embodiment, storage device 130 includes flash lifespan management program 132. In an embodiment, flash lifespan management program 132 is a program, application, or subprogram of a larger program for extending the lifespan of a flash-based storage device.

In an embodiment, storage device 130 includes memory controller 134, which is the actual memory controller that controls the flash devices on storage device 130. In an embodiment, flash lifespan management program 132 resides on memory controller 134. In an embodiment, storage device 130 includes flash devices 136, which are the actual memory devices in storage device 130. In an embodiment, storage device 130 may include any number of flash devices 136.

Figure 2:
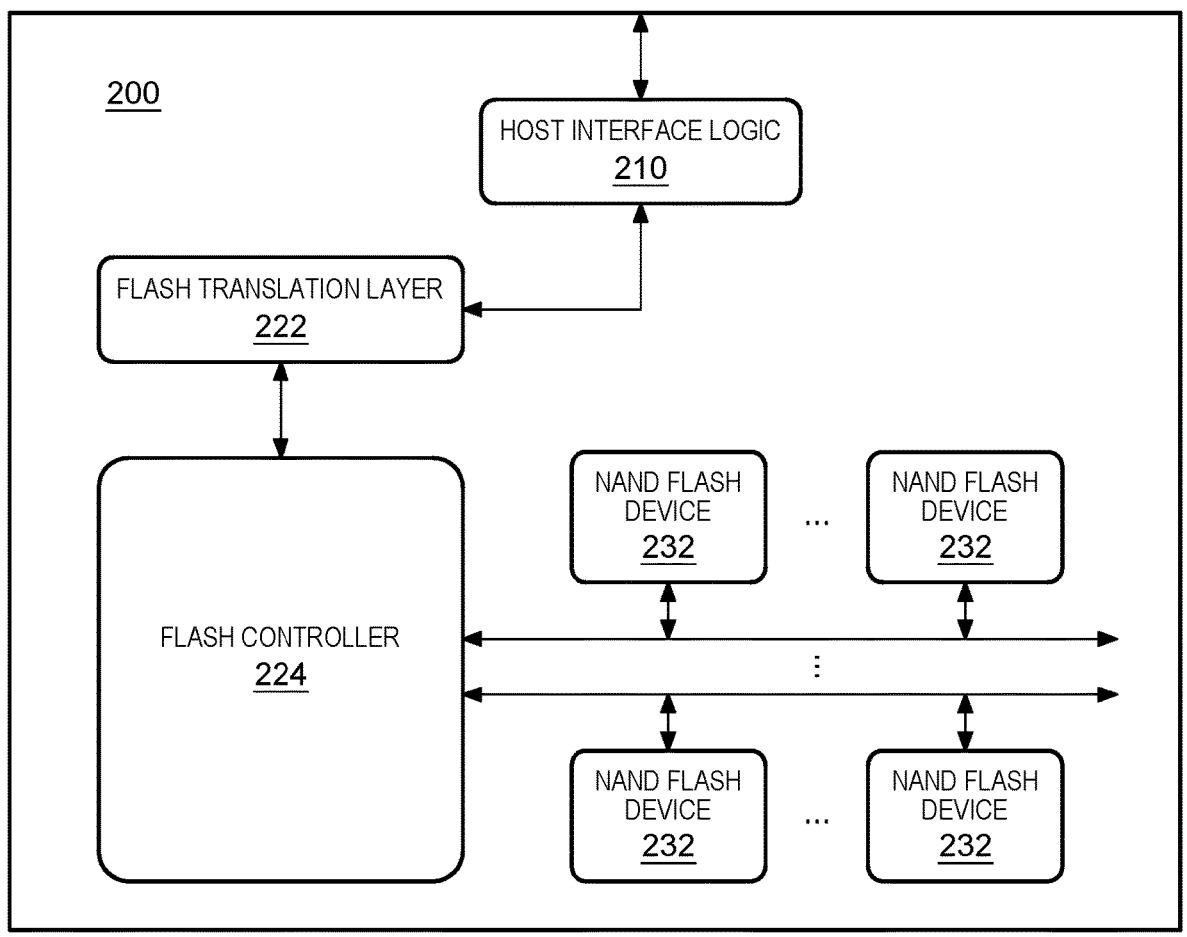
FIG. 2 is an example of the components of a flash-based storage device within the distributed data processing environment of FIG. 1, in accordance with an embodiment of the present invention.

FIG. 2 is an example of the components of a flash-based storage device within the distributed data processing environment of FIG. 1, in accordance with an embodiment of the present invention. FIG. 2 represents one possible embodiment of storage device 130 from FIG. 1. Flash-based storage device 200 includes Host Interface Logic 210, which connects flash-based storage device 200 to a host, e.g., computing device 110 from FIG. 1. Host interface logic 210 may be, for example, a Serial ATA (SATA) interface, a Peripheral Component Interconnect Express (PCI Express or PCIe) interface, or any other interface that is used to connect flash-based storage devices to a host as would be known to one skilled in the art.

Flash-based storage device 200 also includes Flash Translation Layer 222, which transparently maps the logical blocks the file system sees at the host to the physical blocks on the flash device. Flash Controller 224 is the memory controller, e.g., memory controller 134 from FIG. 1, that controls the actual flash memory devices, NAND Flash Device 232. Although the example illustrated in FIG. 2 shows four NAND flash devices 232, flash-based storage device 200 may contain any number of NAND flash devices 232.

Figure 3:
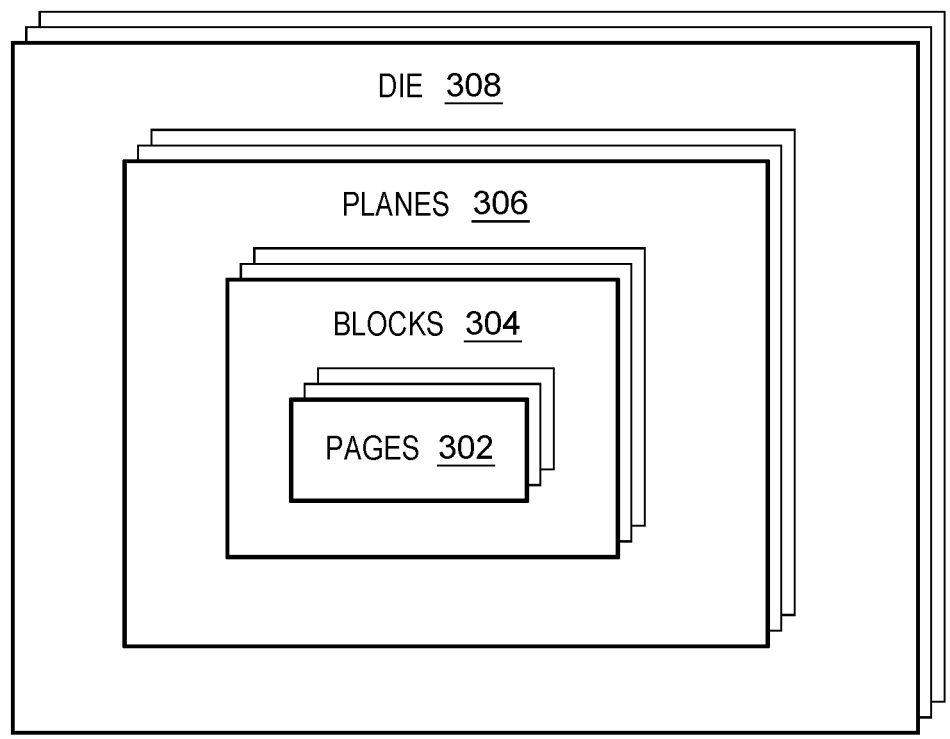
FIG. 3 is an example of the organization of a flash memory device, in accordance with an embodiment of the present invention.

FIG. 3 is an example of the organization of a flash memory device, in accordance with an embodiment of the present invention. It should be appreciated that the diagram depicted in FIG. 3 illustrates one possible organization of a typical flash memory device. Many modifications to the depicted organization may be made by those skilled in the art without departing from the scope of the invention as recited by the claims.

In the example flash memory device organization of FIG. 3, pages 302 are the smallest unit that can be programmed in the flash device. In an example flash device, a page may contain approximately 4k bytes. Blocks 304 are the smallest unit that can be erased in the flash device. In an example flash device, a block may contain 768 pages. Planes 306 contain a certain number of blocks that are typically connected through the same bitline. Typically, identical concurrent operations can take place on each plane within a die. Die 308 consists of one or more planes 306, and the peripheral circuitry that is needed to perform all the read/program/erase operations.

FIG. 4a is an example of a typical layout of a non-log-structured file system, on a storage device within the distributed data processing environment of FIG. 1, in accordance with an embodiment of the present invention.

Disk 410 includes boot record 412, e.g., the Master Boot Record (MBR) that indicates where the operating system is located on the storage device to enable the operating system to boot. Partition Table 414 is a table maintained on disk 410 by the operating system that outlines and describes the partitions on disk 410. Partition A 420, Partition B 422, and Partition n 424 represent the individual partitions created on disk 410 by the operating system. Partitions are regions on a storage device created to allow the operating system to manage each partition separately.

FIG. 4b illustrates an example of a typical partition, e.g., partition A 420, partition B 422, or partition n 424, of the non-log-structured file system illustrated in FIG. 4a. Partition 430 includes Boot Block 432, which is a dedicated block usually at the beginning (first block on first track) of a storage medium that holds special data used to start a system. Free space management is the process of looking after and managing the free blocks of the storage device. Free Space Management 434 holds the mapping of the free space on disk 410 for the operating system. For example, free space management 434 may hold a linked list of the free blocks on partition 430. Modes 436 is a data structure that describes a file system object such as a file or a directory. Each inode stores the attributes and storage device block locations of the object's data. Root Directory 438 is the location of the first or top-most directory in the directory hierarchy of partition 430. Data Area 440 is the largest section of partition 430 and is the section that holds the files and directories stored on partition 430 by the operating system.

FIG. 5a illustrates an example of a typical layout of an LFS file system, e.g., file system 116 from FIG. 1. An LFS is a file system in which data and metadata are written sequentially to a circular buffer, called a log. Any new writes (data as well as metadata, e.g., inodes) will be written to an in-memory segment (typically 1-4 MB versus the typical block size of 512B-4 KB). When the segment is full, the entire segment is written as a whole to the storage device at the front of the circular buffer, hence the reference as a log.

The circular buffer will fill up eventually, but since there are no in-place overwrites, only additions to the log, there are orphaned segments (i.e., overwritten data and metadata blocks). A cleaner thread, therefore, goes through the tail of the log and analyzes each segment, identifying stale blocks and inodes. Anything not stale is written back to the front of the log, while the rest is discarded. Hence there should always be a section between the tail and the head that defines unused blocks of the file system, although the unused blocks may have stale content and are still considered used blocks from the devices perspective.

The example of FIG. 5a includes segments that are in use, e.g., Seg-4 510, which is at the head of the circular buffer, and Seg-0 518, which is at the tail of the circular buffer. FIG. 5a also includes free segments FSeg-0 512, FSeg-1 514, and FSeg-2 516. In an LFS, each segment points to the next segment in the buffer. Here, since FSeg-0 512 is the first free segment, it points to FSeg-1 514, the next free segment, as illustrated by Pointer-1 520.

FIG. 5b illustrates the example of a typical layout of file system in a log-structured file system from FIG. 5a, but with the present invention incorporated, on a computing device within the distributed data processing environment of FIG. 1, in accordance with an embodiment of the present invention. In the example illustrated in FIG. 5b, Seg-4 530 is at the head of the circular buffer and Seg-0 538 is at the tail of the circular buffer. FSeg-0 532 is the first free segment, but in the example of FIG. 5b, an LFBR event has been reached.

In response to the LFBR event, the present invention will first run through the free section (from tail to head of the circular buffer) and mark one or more segments as unused and communicate that to the device. The device in return releases the physical blocks associated with the segment, e.g., Block 534, and marks the FTL entries for these logical blocks as not present. In addition, the segment (at the end a range of logical blocks) is set aside and removed from the circular log. Removing a segment from the log implies that the pointer is skipped over when the head is moved, which is illustrated by Pointer-2 540. In FIG. 5*b*, pointer-2 540 skips the now removed block 534, and instead points to Fseg-2 536.

Figure 6:
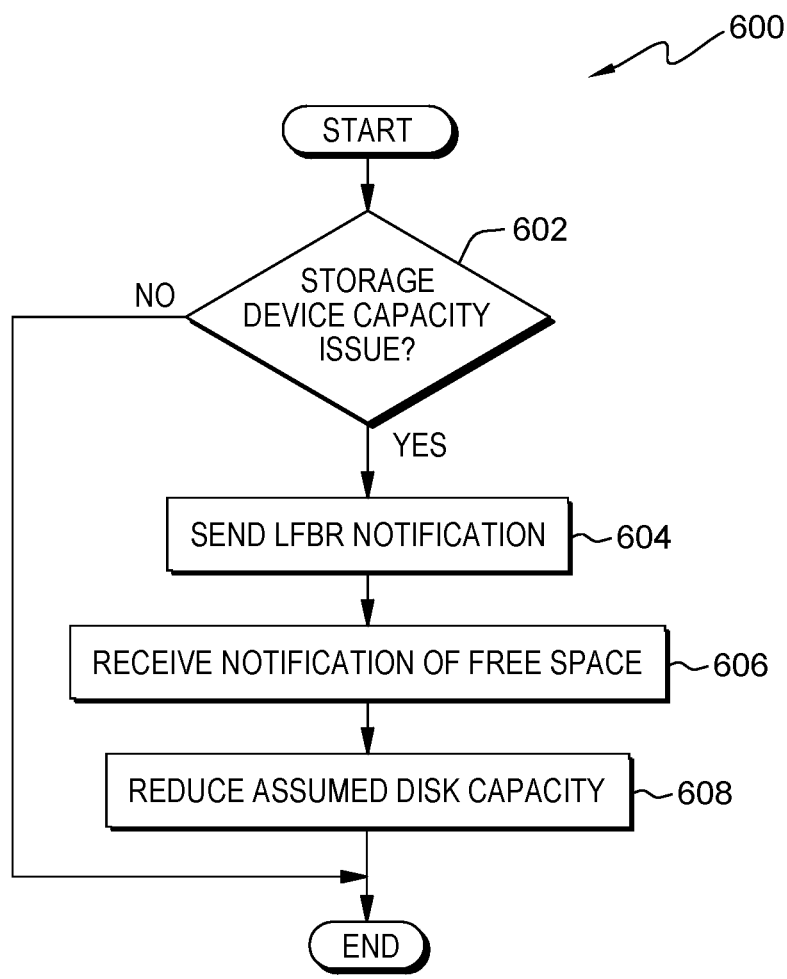
FIG. 6 represents the steps performed by the flash lifespan management program on a memory controller within the distributed data processing environment of FIG. 1 that determines whether there is a capacity issue on a storage device, in accordance with an embodiment of the present invention.

FIG. 6 represents the steps performed by flash lifespan management program 132 on memory controller 134 that determines that there is a capacity issue on the storage device, in accordance with an embodiment of the present invention. In an embodiment, flash lifespan management program 132 provides an Application Programming Interface (API) to inform file system management program 112 how many good blocks remain on storage device 130.

In an embodiment, flash lifespan management program 132 determines if there is a capacity issue on the storage device. In an embodiment, if a write to the storage device fails due to wear out, then flash lifespan management program 132 determines that there is a capacity issue. In an embodiment, flash lifespan management program 132 sends the LFBR notification to file system management program 112. In an embodiment, flash lifespan management program 132 receives the notification of the amount of free space that has been released by the file system from file system management program 112. In an embodiment, flash lifespan management program 132 reduces the advertised storage device capacity by the amount of space that has been freed by file system management program 112 that was received in step 606. In an embodiment, flash lifespan management program 132 then ends for this cycle.

In an alternative embodiment, the steps of workflow 600 may be performed by any other program while working with flash lifespan management program 132. It should be appreciated that embodiments of the present invention provide at least for extending the lifespan of a flash-based storage device. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 6 illustrates one possible iteration of the operational steps performed by flash lifespan management program 132 for determining if there is a capacity issue on the storage device, which runs each time a write to the storage device fails.

Flash lifespan management program 132 determines if there is a storage device capacity issue (decision block 602). In an embodiment, flash lifespan management program 132 determines if there is a capacity issue on the storage device. In an embodiment, flash lifespan management program 132 determines that there is a storage device capacity issue on the storage device proactively by monitoring the number of available physical blocks on the storage device. In an embodiment, if the number of available physical blocks on the storage device drops below a predetermined minimum threshold, then flash lifespan management program 132 determines that there is a capacity issue.

In an embodiment, flash lifespan management program 132 determines that there is a storage device capacity issue on the storage device passively when a write to the storage device fails due to wear out (i.e., no extra working blocks are available). In an embodiment, if a write to the storage device fails due to wear out, then flash lifespan management program 132 determines that there is a capacity issue.

In an embodiment, if flash lifespan management program 132 determines that there is not a capacity issue on the storage device ("no" branch, decision block 602), then flash lifespan management program 132 ends for this cycle. In an embodiment, if flash lifespan management program 132 determines that there is a capacity issue on the storage device ("yes" branch, decision block 602), then flash lifespan management program 132 proceeds to step 604.

Flash lifespan management program 132 sends an LFBR notification (step 604). In an embodiment, flash lifespan management program 132 sends the LFBR notification to file system management program 112. In an embodiment, flash lifespan management program 132 sends the LFBR notification to file system management program 112 using an interrupt. In another embodiment, flash lifespan management program 132 sends the LFBR notification to file system management program 112 using any other appropriate method as would be known to a person of skill in the art.

Flash lifespan management program 132 receives a notification of free space (step 606). In an embodiment, flash lifespan management program 132 receives the notification of the amount of free space that has been released by the file system from file system management program 112. In an embodiment, if a non-LFS file system is in use, the amount of free space is determined by file system management program 112 using the flow diagram of FIG. 7 below. In another embodiment, if an LFS file system is in use, the amount of free space is determined by file system management program 112 using the flow diagram of FIG. 8 below.

Flash lifespan management program 132 reduces the advertised storage device capacity (step 608). In an embodiment, flash lifespan management program 132 determines if the number of valid physical blocks is greater the number of used logical blocks on the storage device. In an embodiment, if flash lifespan management program 132 determines if the number of valid physical blocks is greater the number of used logical blocks on the storage device, then flash lifespan management program 132 reduces the advertised storage device capacity by the amount of space that has been freed by file system management program 112 that was received in step 606.

In an embodiment, flash lifespan management program 132 then ends for this cycle.

Figure 7:
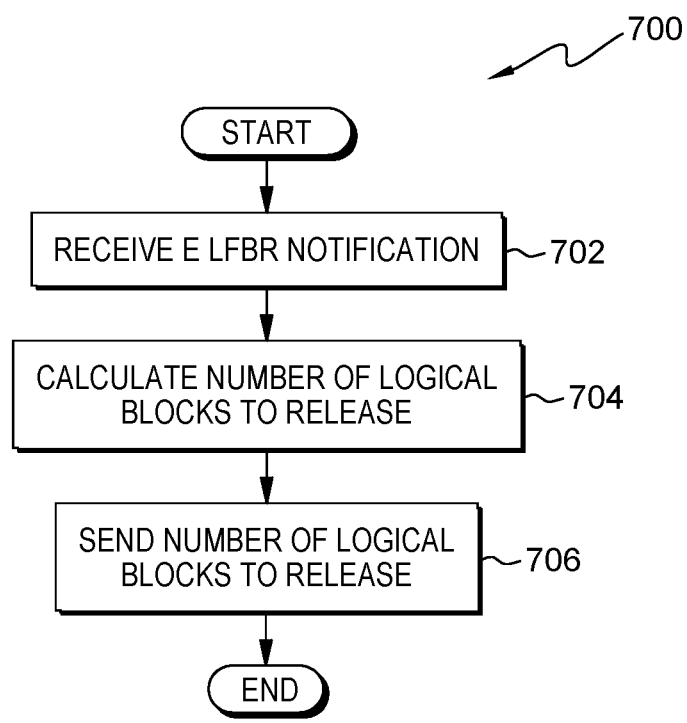
FIG. 7 represents the steps performed by the section of the file system management program on a computing device within the distributed data processing environment of FIG. 1 that calculates the possible reduction in the number of logical blocks upon notification that there is a storage device capacity issue, in accordance with an embodiment of the present invention.

FIG. 7 represents the steps performed by the section of file system management program 112 on computing device 110 that calculates the possible reduction in the number of logical blocks upon notification that there is a storage device capacity issue, in accordance with an embodiment of the present invention. This section of code executes in response to receiving the storage device capacity issue notification from flash lifespan management program 132 as determined in the flow diagram of FIG. 6 above if a non-LFS file system is in use.

In an embodiment, file system management program 112 receives the LFBR notification from flash lifespan management program 132 that resides in memory controller 134. In an embodiment, if file system management program 112 has determined that a non-LFS file system is in use, then the free space consists of logical blocks that can be released. In an embodiment, file system management program 112 sends the list of logical blocks to release that was calculated in step 704 to flash lifespan management program 132 on memory controller 134. In an embodiment, file system management program 112 then ends for this cycle.

In an alternative embodiment, the steps of workflow 700 may be performed by any other program while working with file system management program 112. It should be appreciated that embodiments of the present invention provide at least for extending the lifespan of a flash-based storage device. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 7 illustrates one possible iteration of the operational steps performed by file system management program 112 for calculating the possible reduction in the number of logical blocks upon notification that there is a storage device capacity issue, which repeats each time a notification is received from flash lifespan management program 132 that there is a storage device capacity issue.

File system management program 112 receives an LFBR notification (step 702). In an embodiment, file system management program 112 receives the LFBR notification from flash lifespan management program 132 that resides in memory controller 134. In an embodiment, file system management program 112 receives the LFBR notification from flash lifespan management program 132 via an interrupt. In another embodiment, file system management program 112 receives the LFBR notification from flash lifespan management program 132 via any other appropriate method as would be known to a person of skill in the art.

File system management program 112 calculates the number of logical blocks to release (step 704). In an embodiment, if file system management program 112 has determined that a non-LFS file system is in use, then the free space consists of logical blocks that can be released. In this embodiment, file system management program 112 calculates the number of logical blocks that can be released and creates a list of these blocks. In an embodiment, the file system maintains whether each logical block can be used, for example using a bitmap. In an embodiment, when the LFBR event is received, file system management program 112 computes how many blocks it may free to avoid the imminent wear-leveling exhaustion.

File system management program 112 sends the number of logical blocks to release (step 706). In an embodiment, file system management program 112 sends the list of logical blocks to release that was calculated in step 704 to flash lifespan management program 132 on memory controller 134.

In an embodiment, file system management program 112 marks sufficient free blocks as unavailable, notifies flash lifespan management program 132 on memory controller 134 which logical blocks are voluntarily being released, and flash lifespan management program 132 releases the translation of the underlying physical block, thereby returning the blocks to the free pool. Over time the capacity of the storage device will gradually be reduced, thereby avoiding early non-functionality of the device as with current technology. Similarly, as file system today size each partition's section based on some parameters (e.g., number of inodes versus number of data blocks), logical blocks can be resized equally among the sections.

In an embodiment, file system management program 112 then ends for this cycle.

Figure 8:
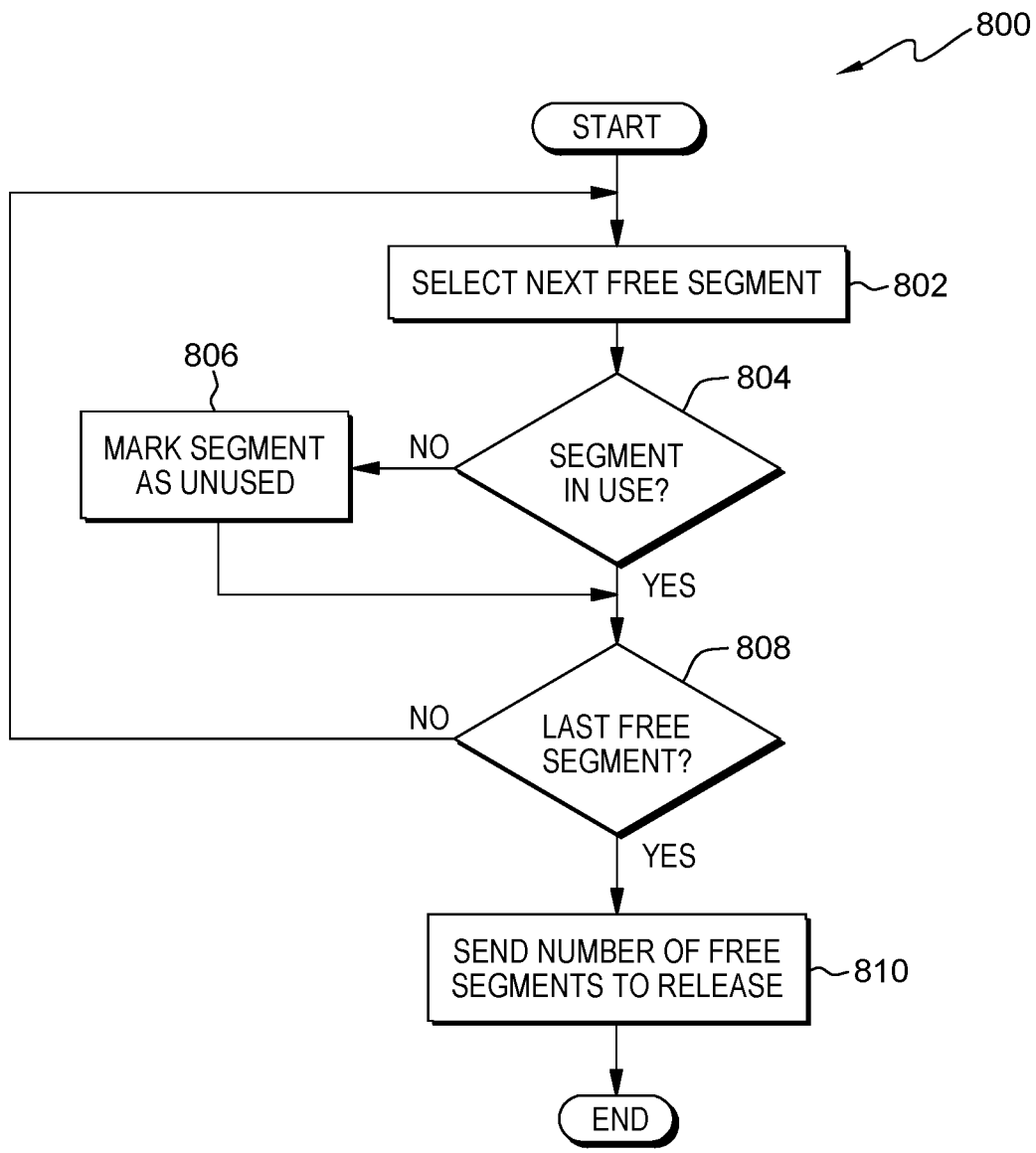
FIG. 8 represents the steps performed by the section of the file system management program on a computing device within the distributed data processing environment of FIG. 1 that calculates the possible reduction in the number of free segments upon notification from the flash lifespan management program that there is a storage device capacity issue, in accordance with an embodiment of the present invention

FIG. 8 represents the steps performed by file system management program 112 on computing device 110 that calculates the possible reduction in the number of free segments upon notification from flash lifespan management program 132 that there is a storage device capacity issue, in accordance with another embodiment of the present invention. This section of code executes in response to receiving the storage device capacity issue notification from flash lifespan management program 132 as determined in the flow diagram of FIG. 6 above if an LFS file system is in use.

In an embodiment, file system management program 112 boots the memory adapter normally. In an embodiment, file system management program 112 determines if the segment selected in step 802 is currently in use. In an embodiment, file system management program 112 marks the currently selected segment as unused and adds this segment to a list to send to flash lifespan management program 132 on memory controller 134. In an embodiment, file system management program 112 determines if there are any segments remaining in the free segment chain to be checked. In an embodiment, file system management program 112 sends the list of free segments to release that was calculated in step 803 to flash lifespan management program 132 on memory controller 134. In an embodiment, file system management program 112 then ends for this cycle.

In an alternative embodiment, the steps of workflow 800 may be performed by any other program while working with file system management program 112. It should be appreciated that embodiments of the present invention provide at least for extending the lifespan of a flash-based storage device. However, FIG. 8 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 8 illustrates one possible iteration of the operational steps performed by file system management program 112 for calculating the possible reduction in the number of free segments upon notification from flash lifespan management program 132 that there is a storage device capacity issue, which repeats each time a notification is received from flash lifespan management program 132 that there is a storage device capacity issue.

File system management program 112 selects the next free segment (step 802). In an embodiment, file system management program 112 boots the memory adapter normally. In an embodiment, file system management program 112 selects the next free segment in the free section, i.e., the section of the circular buffer extending from the tail of the buffer to the head of the buffer.

File system management program 112 determines if the segment is in use (decision block 804). In an embodiment, file system management program 112 determines if the segment selected in step 802 is currently in use. In an embodiment, if file system management program 112 determines that the segment selected in step 802 is not currently in use ("no" branch, decision block 804), then file system management program 112 proceeds to step 806 to mark the segment as unused. In an embodiment, if file system management program 112 determines that the segment selected in step 802 is currently in use ("yes" branch, decision block 804), then file system management program 112 proceeds to decision block 808 to determine if all free segments have been checked.

File system management program 112 marks the segment as unused (step 806). In an embodiment, file system management program 112 marks the currently selected segment as unused and adds this segment to a list to send to flash lifespan management program 132 on memory controller 134.

File system management program 112 determines if the segment is the last free segment (decision block 808). In an embodiment, file system management program 112 determines if there are any segments remaining in the free segment chain to be checked. If file system management program 112 determines that there are no remaining free segments to be checked, then the current segment is the last free segment. In an embodiment, if file system management program 112 determines that the current segment is not the last free segment ("no" branch, decision block 808), then file system management program 112 returns to step 802 to select the next free segment. In an embodiment, if file system management program 112 determines that the current segment is the last free segment ("yes" branch, decision block 808), then file system management program 112 proceeds to step 810.

File system management program 112 sends the number of free segments to release (step 810). In an embodiment, file system management program 112 sends the list of free segments to release that was calculated in step 803 to flash lifespan management program 132 on memory controller 134. In an embodiment, file system management program 112 sends the list of free segments to release that was calculated in step 803 to flash lifespan management program 132 on memory controller 134 using any appropriate method as would be known to a person of skill in the art.

In an embodiment, file system management program 112 then ends for this cycle.

Figure 9:
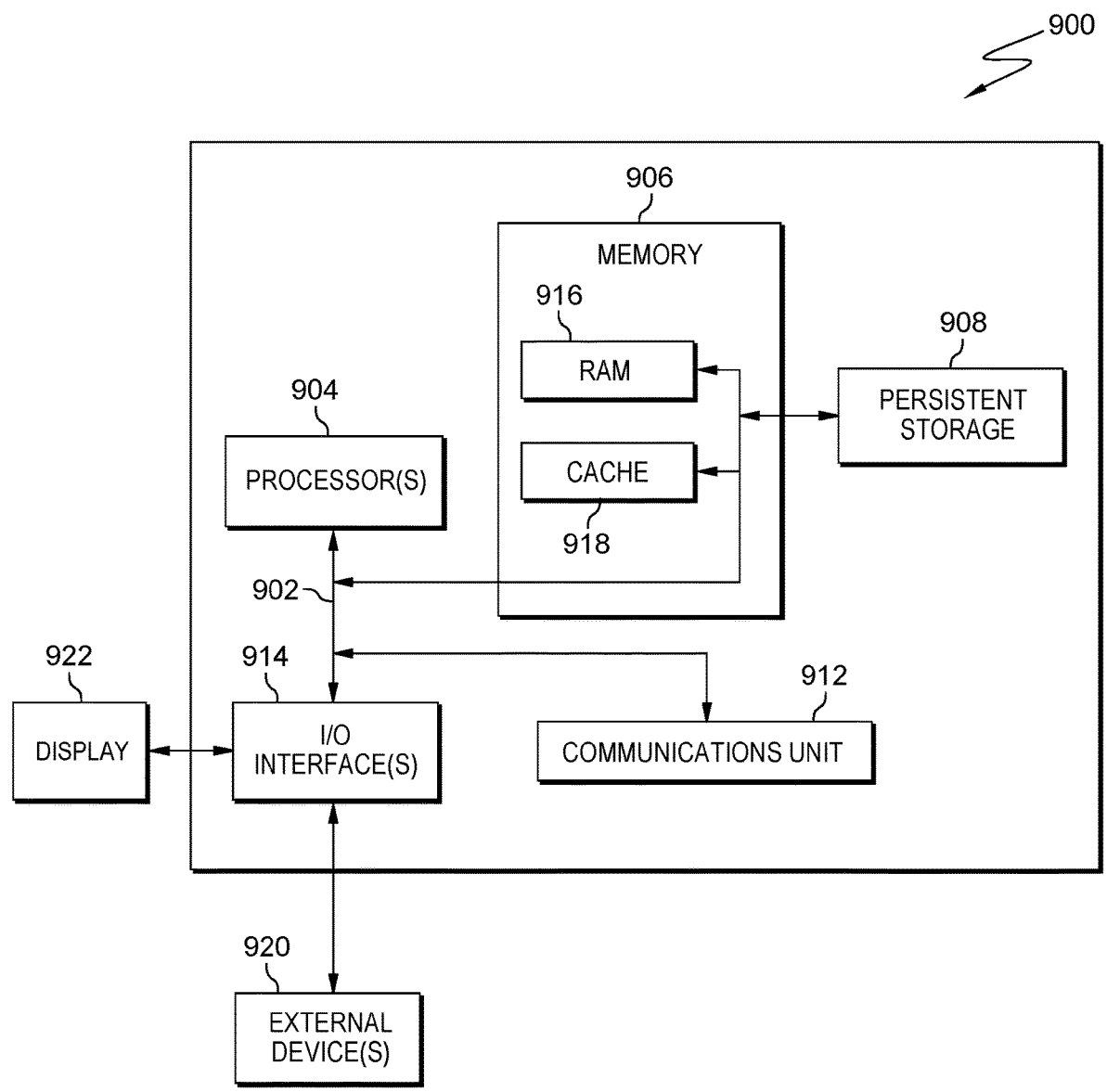
FIG. 9 depicts a block diagram of components of the computing devices executing the file system management program within the distributed data processing environment of FIG. 1, in accordance with an embodiment of the present invention.

FIG. 9 is a block diagram depicting components of computing device 110 suitable for file system management program 112 and storage device 130 suitable for flash lifespan management program 132, in accordance with at least one embodiment of the invention. FIG. 9 displays computer 900; one or more processor(s) 904 (including one or more computer processors); communications fabric 902; memory 906, including random-access memory (RAM) 916 and cache 918; persistent storage 908; communications unit 912; I/O interfaces 914; display 922; and external devices 920. It should be appreciated that FIG. 9 provides only an illustration of one embodiment and does not imply any limitations with regard to the environments in which different embodiments may be implemented. Many modifications to the depicted environment may be made.

As depicted, computer 900 operates over communications fabric 902, which provides communications between computer processor(s) 904, memory 906, persistent storage 908, communications unit 912, and I/O interface(s) 914. Communications fabric 902 may be implemented with any architecture suitable for passing data or control information between processors 904 (e.g., microprocessors, communications processors, and network processors), memory 906, external devices 920, and any other hardware components within a system. For example, communications fabric 902 may be implemented with one or more buses.

Memory 906 and persistent storage 908 are computer readable storage media. In the depicted embodiment, memory 906 comprises RAM 916 and cache 918. In general, memory 906 can include any suitable volatile or non-volatile computer readable storage media. Cache 918 is a fast memory that enhances the performance of processor(s) 904 by holding recently accessed data, and near recently accessed data, from RAM 916.

Program instructions for file system management program 112 may be stored in persistent storage 908, or more generally, any computer readable storage media, for execution by one or more of the respective computer processors 904 via one or more memories of memory 906. Persistent storage 908 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. In the context of some embodiments of the present invention, the source of the various input data may be physically remote to computer 900 such that the input data may be received, and the output similarly transmitted via communications unit 912.

I/O interface(s) 914 allows for input and output of data with other devices that may be connected to computer 900. For example, I/O interface(s) 914 may provide a connection to external device(s) 920 such as a keyboard, a keypad, a touch screen, a microphone, a digital camera, and/or some other suitable input device. External device(s) 920 can also include portable computer readable storage media such as, for example, thumb drives, portable optical or magnetic disks, and memory cards. Software and data used to practice embodiments of the present invention, e.g., file system management program 112, can be stored on such portable computer readable storage media and can be loaded onto persistent storage 908 via I/O interface(s) 914. I/O interface(s) 914 also connect to display 922.

Display 922 provides a mechanism to display data to a user and may be, for example, a computer monitor. Display 922 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

responsive to receiving a signal from a storage device that the storage device is low on extra blocks, releasing, by one or more computer processors, one or more free logical blocks that are no longer needed wherein releasing the one or more free logical blocks that are no longer needed comprises:
examining, by the one or more computer processors, a bitmap, wherein the bitmap indicates whether each logical block on the storage device can be used; and
selecting, by the one or more computer processors, the one or more free logical blocks that are no longer needed based on the number of logical blocks that can be released;
notifying, by the one or more computer processors, the storage device of the one or more free logical blocks that are no longer needed; and
responsive to determining that a number of valid physical blocks is greater than a number of used logical blocks, reducing, by the one or more computer processors, an advertised capacity of the storage device.

2. The computer-implemented method of claim 1, wherein the advertised capacity of the storage device is reduced by a capacity of the one or more free logical blocks that are no longer needed.

3. The computer-implemented method of claim 1, wherein responsive to receiving the signal from the storage device that the storage device is low on the extra blocks, releasing the one or more free logical blocks comprises:
responsive to a write operation failing due to no capacity of extra free logical blocks on the storage device, releasing, by the one or more computer processors, the one or more free logical blocks.

4. The computer-implemented method of claim 1, wherein the storage device is based on flash memory.

5. The computer-implemented method of claim 1, wherein the advertised capacity of the storage device is reduced without unmounting the storage device.

6. The computer-implemented method of claim 1, wherein a non-log-structured file system is used.

7. The computer-implemented method of claim 1, wherein responsive to receiving the signal from the storage device that the storage device is low on the extra blocks, releasing the one or more free logical blocks that are no longer needed comprises:
determining, by the one or more computer processors, a number of logical blocks that can be released based on examining each logical block on the storage device; and
releasing, by the one or more computer processors, the one or more free logical blocks that are no longer needed.

8. A computer-implemented method comprising:
responsive to receiving a signal from a storage device that the storage device is low on extra segments, wherein a file system is organized as a circular buffer consisting of a plurality of segments, examining, by one or more computer processors, a free section of the circular buffer;
responsive to determining that one or more segments of the plurality of segments are unused, marking, by the one or more computer processors, the one or more segments of the plurality of segments as unused;
notifying, by the one or more computer processors, the storage device of the one or more segments that are unused;
marking, by the one or more computer processors, a flash translation layer table to indicate that the one or more segments of the plurality of segments that are unused are no longer present, wherein marking the flash translation layer table to indicate that the one or more segments of the plurality of segments that are unused are no longer present reduces an advertised capacity of the storage device;
responsive to determining that the circular buffer is filling up, running, by the one or more computer processors, a cleaner thread to analyze each segment at a tail of the circular buffer to identify one or more stale blocks and one or more non-stale blocks; and
writing, by the one or more computer processors, the one or more non-stale blocks to a front of the circular buffer.

9. The computer-implemented method of claim 8, wherein the advertised capacity of the storage device is reduced by a capacity of the one or more segments of the plurality of segments that are unused.

10. The computer-implemented method of claim 8, wherein responsive to receiving the signal from the storage device that the storage device is low on the extra segments, wherein the file system is organized as the circular buffer consisting of the plurality of segments, examining the free section of the circular buffer comprises:
responsive to a write operation failing due to no extra segments on the storage device, wherein the file system is organized as the circular buffer consisting of the plurality of segments, examining, by the one or more computer processors, the free section of the circular buffer.

11. The computer-implemented method of claim 8, further comprising:
discarding, by the one or more computer processors, the one or more stale blocks.

12. The computer-implemented method of claim 8, wherein the storage device is based on flash memory.

13. The computer-implemented method of claim 8, wherein the advertised capacity of the storage device is reduced without unmounting the storage device.

14. The computer-implemented method of claim 8, wherein a log-structured file system is used.

15. A computer system comprising:
one or more computer processors;
one or more computer readable storage media; and
program instructions stored on the one or more computer readable storage media for execution by at least one of the one or more computer processors, the stored program instructions including instructions to:
responsive to receiving a signal from a storage device that the storage device is low on extra blocks, release one or more free logical blocks that are no longer needed wherein releasing the one or more free logical blocks that are no longer needed comprises:
examining a bitmap, wherein the bitmap indicates whether each logical block on the storage device can be used; and
determining a number of logical blocks that can be released based on examining each logical block on the storage device;
notify the storage device of the one or more free logical blocks that are no longer needed; and
responsive to determining that a number of valid physical blocks is greater than a number of used logical blocks, reduce an advertised capacity of the storage device.

16. The computer system of claim 15, wherein the advertised capacity of the storage device is reduced by a capacity of the one or more free logical blocks that are no longer needed.

17. The computer system of claim 15, wherein responsive to receiving the signal from the storage device that the storage device is low on the extra blocks, release the one or more free logical blocks comprises one or more of the following program instructions, stored on the one or more computer readable storage media, to:
   responsive to a write operation failing due to no capacity of extra free logical blocks on the storage device, release the one or more free logical blocks.

18. The computer system of claim 15, wherein the storage device is based on flash memory.

19. The computer system of claim 15, wherein the advertised capacity of the storage device is reduced without unmounting the storage device.

20. The computer system of claim 15, wherein responsive to receiving the signal from the storage device that the storage device is low on the extra blocks, release the one or more free logical blocks that are no longer needed comprises one or more of the following program instructions, stored on the one or more computer readable storage media, to:
   select the one or more free logical blocks that are no longer needed based on the number of logical blocks that can be released; and
   release the one or more free logical blocks that are no longer needed.

* * * * *